(12) United States Patent
Aono et al.

(10) Patent No.: US 8,869,059 B2
(45) Date of Patent: Oct. 21, 2014

(54) LAYOUT METHOD FOR OPERATION KEY GROUP IN PORTABLE TERMINAL APPARATUS AND PORTABLE TERMINAL APPARATUS FOR CARRYING OUT THE LAYOUT METHOD

(75) Inventors: Tomotake Aono, Yokohama (JP); Junichi Ujii, Yokohama (JP)

(73) Assignee: Kyocera Corporation, Kyoto (JP)

( * ) Notice: Subject to any disclaimer, the term of this patent is extended or adjusted under 35 U.S.C. 154(b) by 976 days.

(21) Appl. No.: 12/443,452

(22) PCT Filed: Sep. 19, 2007

(86) PCT No.: PCT/JP2007/068191
§ 371 (c)(1),
(2), (4) Date: Nov. 3, 2009

(87) PCT Pub. No.: WO2008/041485
PCT Pub. Date: Apr. 10, 2008

(65) Prior Publication Data
US 2010/0127994 A1    May 27, 2010

(30) Foreign Application Priority Data

Sep. 28, 2006 (JP) ................................. 2006-265289
Oct. 30, 2006 (JP) ................................. 2006-294066

(51) Int. Cl.
*G06F 3/048*    (2013.01)
*G06F 3/0488*   (2013.01)
*H04M 1/02*     (2006.01)

(52) U.S. Cl.
CPC ......... *G06F 3/04886* (2013.01); *H04M 1/0281* (2013.01); *H04M 2250/22* (2013.01)
USPC ........................... 715/773; 715/800; 715/801

(58) Field of Classification Search
None
See application file for complete search history.

(56) References Cited

U.S. PATENT DOCUMENTS 5,936,614 A *    8/1999  An et al. ........................ 345/173
2002/0149605 A1 * 10/2002 Grossman ..................... 345/660
2003/0107604 A1 *  6/2003 Ording ........................... 345/788

(Continued)

FOREIGN PATENT DOCUMENTS

JP     04-257020    9/1992
JP     07-230374    8/1995

(Continued)

OTHER PUBLICATIONS

Japanese language office action dated Oct. 4, 2011 and its English language translation for corresponding Japanese application 2006294066.

(Continued)

*Primary Examiner* — Stephen Hong
*Assistant Examiner* — Asher Kells
(74) *Attorney, Agent, or Firm* — DLA Piper LLP (US)

(57) ABSTRACT

A layout method for an operation key group in a portable terminal apparatus 1 that displays an operation key group on a display unit 4 to perform input operation via a touch panel 5, the layout method including: determining, on the basis of user operation for drawing a line figure on the touch panel 5, a display position and a range of an operation key group displayed on the display unit 4; and displaying the operation key group on the display unit 4 on the basis of the determined display position and the range.

13 Claims, 13 Drawing Sheets

(56) References Cited

U.S. PATENT DOCUMENTS

| | | | |
|---|---|---|---|
| 2004/0046742 A1* | 3/2004 | Johnson | 345/168 |
| 2004/0119750 A1* | 6/2004 | Harrison | 345/773 |
| 2004/0183834 A1* | 9/2004 | Chermesino | 345/773 |
| 2005/0253816 A1* | 11/2005 | Himberg et al. | 345/173 |
| 2006/0007178 A1* | 1/2006 | Davis | 345/173 |
| 2006/0022953 A1* | 2/2006 | Franttila | 345/173 |
| 2006/0077183 A1* | 4/2006 | Studt | 345/173 |
| 2007/0180400 A1* | 8/2007 | Zotov et al. | 715/788 |

FOREIGN PATENT DOCUMENTS

| | | |
|---|---|---|
| JP | 08314596 A | 11/1996 |
| JP | 09-319502 | 12/1997 |
| JP | 10055467 A | 2/1998 |
| JP | 10-149258 | 6/1998 |
| JP | 2000330946 A | 11/2000 |
| JP | 2001-075691 | 3/2001 |
| JP | 2002-051124 | 2/2002 |
| JP | 2002055753 A | 2/2002 |
| JP | 2002164980 A | 6/2002 |
| JP | 2003-022161 | 1/2003 |
| JP | 2003-177848 | 6/2003 |
| JP | 2003316490 A | 11/2003 |
| JP | 2005-012493 | 1/2005 |
| JP | 2006138779 A | 6/2006 |

OTHER PUBLICATIONS

Chinese language office action dated Nov. 9, 2011 and its English language translation for corresponding Chinese application 200780036536.7.

Korean language office action dated Aug. 31, 2011 and its English language translation for corresponding Korean application 1020097006476.

Japanese language office action dated Dec. 20, 2011 and its English language translation for corresponding Japanese application 2011126415.

Korean language office action dated Dec. 23, 2011 and its English language translation for corresponding Korean application 102011702307.

Japanese language office action dated May 15, 2012 and its English language translation issued in corresponding Japanese application 2011126415.

Korean language office action dated Jun. 20, 2012 and its English language translation issued in corresponding Korean application 1020117023307.

Japanese language office action dated Sep. 4, 2012 and its English translation issued in corresponding Japanese application 2006294066.

Japanese language office action dated Feb. 5, 2013 and its English language translation issued in corresponding Japanese application 2011265292.

Japanese language office action (interrogation) dated Mar. 5, 2013 and its English language translation issued in corresponding Japanese application 2011126415.

Japanese language office action dated Aug. 2, 2011 and its English language translation for corresponding Japanese application 2011126415.

Japanese language office action dated Jul. 23, 2013 and its English language Statement of Relevance of Non-English References Pursuant to 37 CFR 1.98(a)(3)(i) issued in corresponding Japanese application 2011126415.

Japanese language office action dated Oct. 22, 2013 and a statement of non-English references pursuant to 37 CFR 1.98(a)(3)(i) issued in corresponding Japanese application 20112656292.

Japanese language office action dated Nov. 12, 2013 and its English language Statement of Relevance of Non-English References Pursuant to 37 CFR 1.98(a)(3)(i) issued in corresponding Japanese application 2011126415.

Japanese language office action dated Aug. 20, 013 and its English language Statement of Relevance of Non-English References Pursuant to 37 CFR 1.98(a)(3)(i) issued in corresponding Japanese application 2012243780.

Japanese language office action dated Aug. 20, 2013 and its English language Statement of Relevance of Non-English References Pursuant to 37 CFR 1.98(a)(3)(i) issued in corresponding Japanese application 2012243782.

Chinese language office action dated Jun. 10, 2010 and its English language translation issued in corresponding Chinese application 200780036536.7.

Korean language office action dated Nov. 26, 2010 and its English language translation issued in corresponding Korean application 1020097006476.

* cited by examiner (A)

(B)

(A)

(B)

(A) (B)

(A) (B)

(a)

(b)

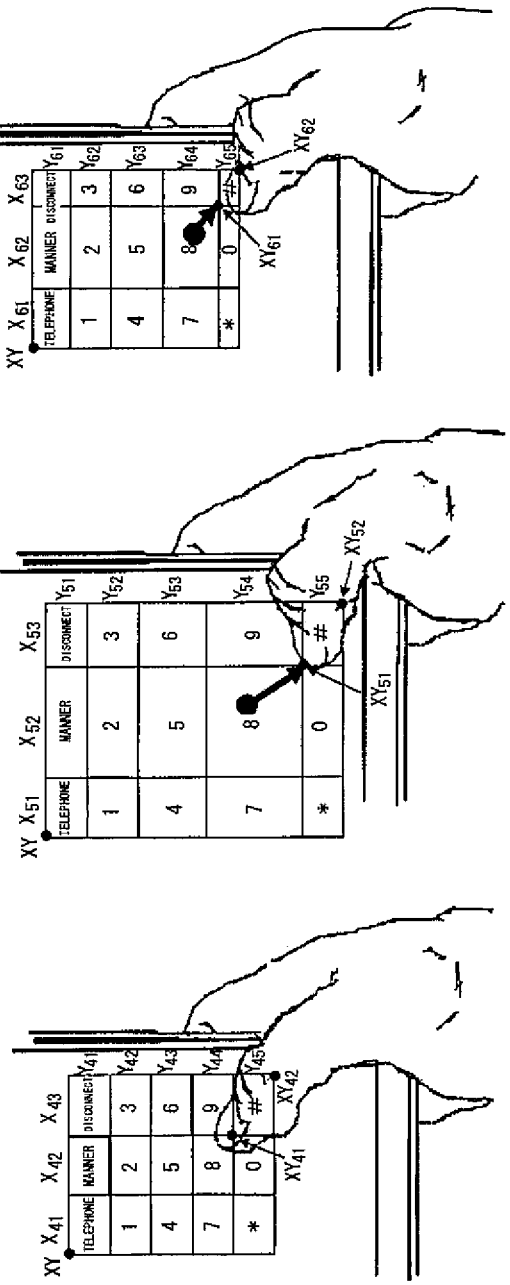

LAYOUT METHOD FOR OPERATION KEY GROUP IN PORTABLE TERMINAL APPARATUS AND PORTABLE TERMINAL APPARATUS FOR CARRYING OUT THE LAYOUT METHOD

CROSS-REFERENCE TO RELATED APPLICATIONS

This application is a national stage of International Application No. PCT/JP2007/068191, filed on Sep. 19, 2007, and claims the benefit of priority under 35 USC 119 of Japanese Patent Application No. 2006-265289, filed on Sep. 28, 2006, and Japanese Patent Application No. 2006-294066, filed on Oct. 30, 2006, which are incorporated herein by reference.

TECHNICAL FIELD

The present invention relates to a layout method for an operation key group in a portable terminal apparatus and a portable terminal apparatus for carrying out the layout method, and, more particularly to a layout method for an operation key group in a portable terminal apparatus in which a touch panel is used in inputting information and a portable terminal apparatus for carrying out the layout method.

BACKGROUND ART

In recent years, not only in personal computers but also in portable terminal apparatuses such as cellular phones, there are increasing opportunities for exchanging various kinds of information such as electronic mails by manually inputting the information.

Unlike a desktop personal computer, in order to carry a portable terminal apparatus, it is necessary to reduce a terminal main body in size. According to the reduction in size, contradictory requests, i.e., a reduction in size of a key input system and securing of fixed operability, have to be balanced. Therefore, in this type of portable terminal apparatus, various techniques for improving operability in key input are desired.

As a technique for improving operability of key input in a conventional portable terminal apparatus, there is proposed a technique that makes it possible to reduce stress in key operation by a user by changing arrangement of keys in a key operation system and setting of display in a key operation unit, for example, when the user changes a way of looking at a display screen, i.e., when the user changes the direction of a portable terminal apparatus to operate the portable terminal apparatus.

For example, according to a technique described in Japanese Patent Laid-Open No. 2002-51124 and Japanese Patent Laid-Open No. 2005-12493, even when a user changes the direction of a portable terminal apparatus to operate the portable terminal apparatus, it is possible to always maintain the direction of the portable terminal apparatus with respect to the user by rotating operation keys according to the change in the direction of the portable terminal apparatus. Therefore, the user does not need to remember key arrays corresponding to the directions of the portable terminal apparatus. Further, in both a case in which the user holds the portable terminal apparatus with the right hand to operate the portable terminal apparatus and a case in which the user holds the portable terminal apparatus with the left hand to operate the portable terminal apparatus, it is possible to maintain fixed operability by reversing the operation keys according to the respective cases.

However, the technique according to the Patent Documents is essentially a technique for maintaining original operability even when a display screen on which information is displayed is changed to various directions or when a holding position of a terminal main body, i.e., operation of the terminal main body by the right hand or the left hand is changed. Therefore, the technique is not a technique for improving operability of key input itself during normal use.

With these conventional portable terminal apparatuses, all users perform operation according to configurations of keys peculiar to the portable terminal apparatuses during normal use. The respective users have to adapt themselves to the portable terminal apparatuses to operate the portable terminal apparatuses. Movable ranges of fingers depending on sizes of hands of the users, positions for holding the terminal apparatuses, and the like, movable ranges of the fingers depending on a difference of the right hand and the left hand for operating the portable terminal apparatuses, and the like are not taken into account. Even if the users feel that the present key layout is inconvenient, basically, the key layout cannot be changed or corrected to improve operability. Therefore, there is a problem in that it is difficult for some users to use the terminal apparatuses.

SUMMARY OF INVENTION

Therefore, an object of the present invention devised in view of such points is to provide a layout method for an operation key group of a portable terminal apparatus and the portable terminal apparatus that can set, according to a user, a layout of the operation key group displayed on a touch panel of the portable terminal apparatus and can improve convenience of use.

An invention of an operation key group layout method in a portable terminal apparatus according to a first aspect for attaining the object is a layout method for an operation key group in a portable terminal apparatus that displays the operation key group on a display unit to perform input operation via a touch panel, characterized by including: determining, on the basis of user operation for drawing line figures on the touch panel, a display position and a range of the operation key group displayed on the display unit; and displaying the operation key group on the display unit on the basis of the determined display position and the range.

An invention according to a second aspect is characterized by including, in the layout method for an operation key group in a portable terminal apparatus according to the first aspect, determining a rendering position of a figure continuously drawn on the touch panel by the user and an area surrounded by the figure as the display position and the range of the operation key group, respectively.

An invention according to a third aspect is characterized by including, in the layout method for an operation key group in a portable terminal apparatus according to the first aspect, moving, after displaying the operation key group on the display unit, the display position of the operation key group according to continuous input starting from one point of the operation key group to adjust the display position of the operation key group.

An invention according to a fourth aspect is characterized by including, in the layout method for an operation key group in a portable terminal apparatus according to the second aspect, moving, after displaying the operation key group on the display unit, the display position of the operation key group according to continuous input starting from one point of the operation key group to adjust the display position of the operation key group.

An invention according to a fifth aspect is characterized by including, in the layout method for an operation key group in a portable terminal apparatus according to the third aspect, prohibiting, in moving the display position of the operation key group according to the continuous input starting from the one point of the operation key group, at least a part of the operation key group from being moved to the outside of the display range on the display unit.

An invention according to a sixth aspect is characterized by including, in the layout method for an operation key group in a portable terminal apparatus according to the fourth aspect, prohibiting, in moving the display position of the operation key group according to the continuous input starting from the one point of the operation key group, at least a part of the operation key group from being moved to the outside of the display range on the display unit.

An invention of a portable terminal apparatus according to a seventh aspect for attaining the object is a portable terminal apparatus that displays an operation key group on a display unit to perform input operation via a touch panel, the portable terminal apparatus characterized by including:

storing unit for storing plural patterns of a layout of the operation key group;

determining unit for determining, on the basis of input operation on the touch panel, a display position and a range of the operation key group displayed on the display unit;

selecting unit for selecting the operation key group from the storing unit on the basis of the display position and the range determined by the determining unit; and control unit for performing control to display the operation key group selected by the selecting unit in the display position and the range on the display unit determined by the determining unit.

An invention according to an eighth aspect is characterized in that, in the portable terminal apparatus according to the seventh aspect, the storing unit stores plural patterns of operation key groups for right hand operation and left hand operation, and the selecting unit selects, according to the display position and the range on the display unit determined by the determining unit, any one of the operation key groups for the right hand operation and the left hand operation from the storing unit.

An invention according to a ninth aspect is characterized in that, in the portable terminal apparatus according to the seventh aspect, the control unit performs control to move the display position of the operation key group according to continuous input starting from one point of the operation key group displayed on the display unit.

An invention according to a tenth aspect is characterized in that, in the portable terminal apparatus according to the eighth aspect, the control unit performs control to move the display position of the operation key group according to continuous input starting from one point of the operation key group displayed on the display unit.

An invention according to an eleventh aspect is characterized in that, in the portable terminal apparatus according to the ninth aspect, the control unit controls the movement of the display position of the operation key group to prohibit at least a part of the operation key group from being moved to the outside of a display range on the display unit when the display position of the operation key group is moved according to the continuous input starting from the one point of the operation key group.

Further, an invention of a portable terminal apparatus according to a twelfth aspect for attaining the object is a portable terminal apparatus that displays an operation key group on a display unit to perform input operation via a touch panel, the portable terminal apparatus characterized by including control unit for detecting continuous moving input by the touch panel starting from one point in a display range of the operation key group displayed on the display unit, moving the starting point according to the continuous moving input with a point corresponding to the starting point set as a fixed point, and expanding or reducing the display range of the operation key group according to the movement of the starting point and expanding or reducing at least a part of the operation key group to change a layout of the operation key group.

An invention according to a thirteenth aspect is characterized in that, in the portable terminal apparatus according to the twelfth aspect, the control unit changes the layout of the operation key group to expand the periphery of the starting point at a high expansion ratio and expands the periphery of the fixed point at a low expansion ratio.

An invention according to a fourteenth aspect is characterized in that, in the portable terminal apparatus according to the twelfth aspect, the fixed point is a point where, when the display range of the operation key group is divided into four by two straight line crossing at a point in the center of the display range, a distance from the center is the longest in an area diagonal to an area including the starting point.

An invention according to a fifteenth aspect is characterized in that, in the portable terminal apparatus according to the thirteenth aspect, the fixed point is a point where, when the display range of the operation key group is divided into four by two straight line crossing at a point in the center of the display range, a distance from the center is the longest in an area diagonal to an area including the starting point.

BRIEF DESCRIPTION OF DRAWINGS

FIG. 18 is a diagram for explaining the processing for changing the layout according to the fifth embodiment.

BRIEF DESCRIPTION OF DRAWINGS

Embodiments of the present invention are explained below with reference to the drawings.

First Embodiment

Figure 1:
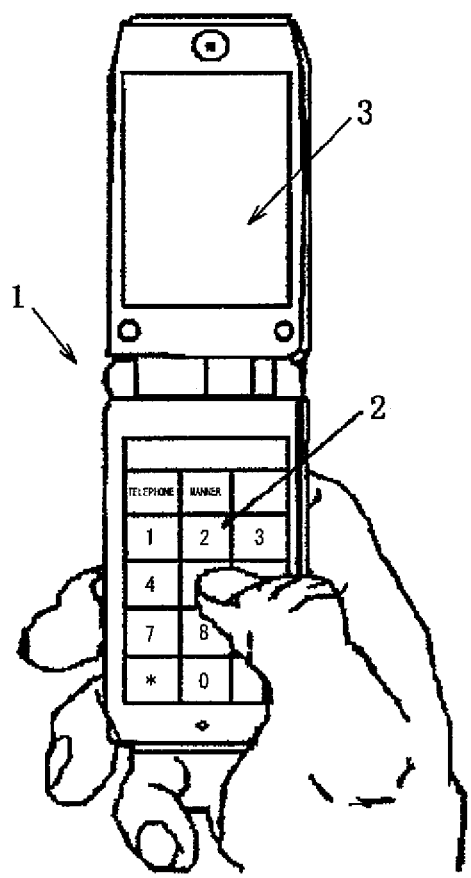
FIG. 1 is a diagram showing an overview of a portable terminal apparatus according to a first embodiment of the present invention.

FIG. 1 is a diagram showing an overview of a cellular phone as a portable terminal apparatus according to a first embodiment of the present invention.

Figure 2:
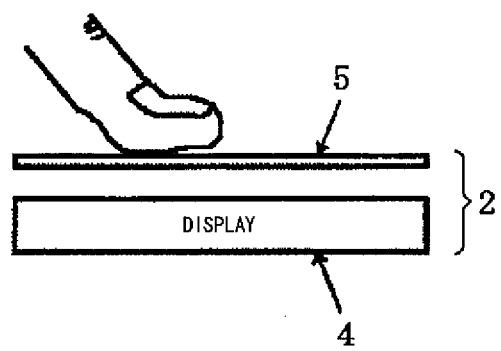
FIG. 2 is a schematic sectional view of an input unit of the portable terminal apparatus shown in FIG. 1.

A portable terminal apparatus 1 includes a rectangular input unit 2 on which a user performs input operation with a finger or the like and a monitor unit 3 that displays input information and the like. As shown in FIG. 2 as a schematic sectional view, the input unit 2 includes a display 4 as a display unit that displays an operation key group and a touch panel 5 arranged on (a front surface of) the display 4 and having a large number of contacts arranged in a matrix shape. The touch panel 5 receives an input of key operation in association with the display 4. Therefore, for example, when the user intends to touch, with a finger, a portion of a number "1" among the operation keys displayed on the display 4, the user actually touches a portion of the touch panel 5 corresponding to the display portion "1" of the display 4. The touch panel 5 outputs a signal corresponding to that portion.

Figure 3:
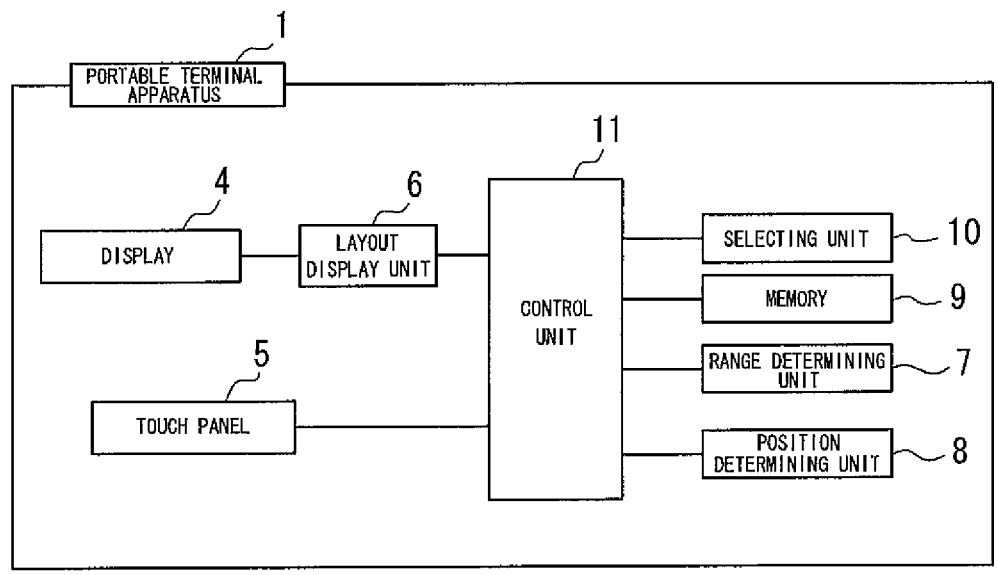
FIG. 3 is a schematic block diagram of a control circuit of the portable terminal apparatus shown in FIG. 1.

FIG. 3 is a block diagram showing a schematic configuration of a control circuit for the portable terminal apparatus 1 according to this embodiment.

The portable terminal apparatus 1 includes the display 4 and the touch panel 5 explained above, layout display unit 6 for displaying a layout of the operation key group (a key layout) on the display 4, range determining unit 7 for determining a range in which the operation key group can be laid out and position determining unit 8 for determining a position of the operation key group, a memory 9 that stores layouts of the operation key group and plural input patterns and the like of the touch panel 5 corresponding to the layouts of the operation key group, selecting unit 10 for selecting, from the memory 9, data of a pattern corresponding to data determined by the range determining unit 7 and the position determining unit 8, and control unit 11 for controlling the entire portable terminal apparatus 1.

An overview of an operation key group layout method according to this embodiment is explained below.

Figure 4:
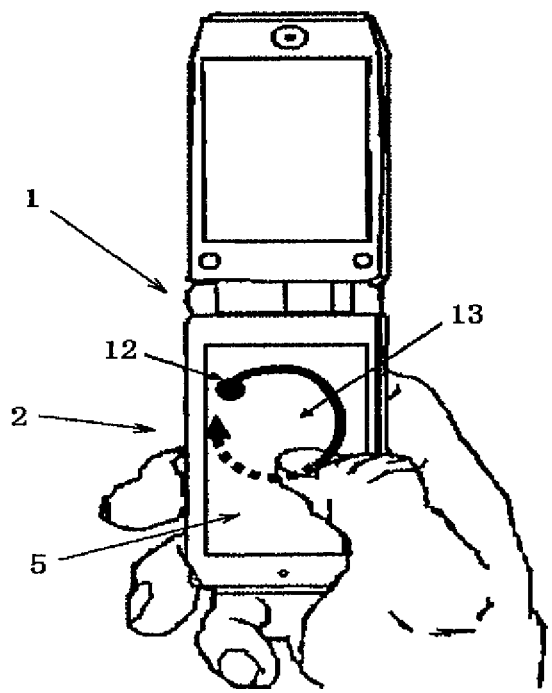
FIG. 4 is a diagram for explaining an overview of an operation key group layout method in the portable terminal apparatus according to the first embodiment.
Figure 12:
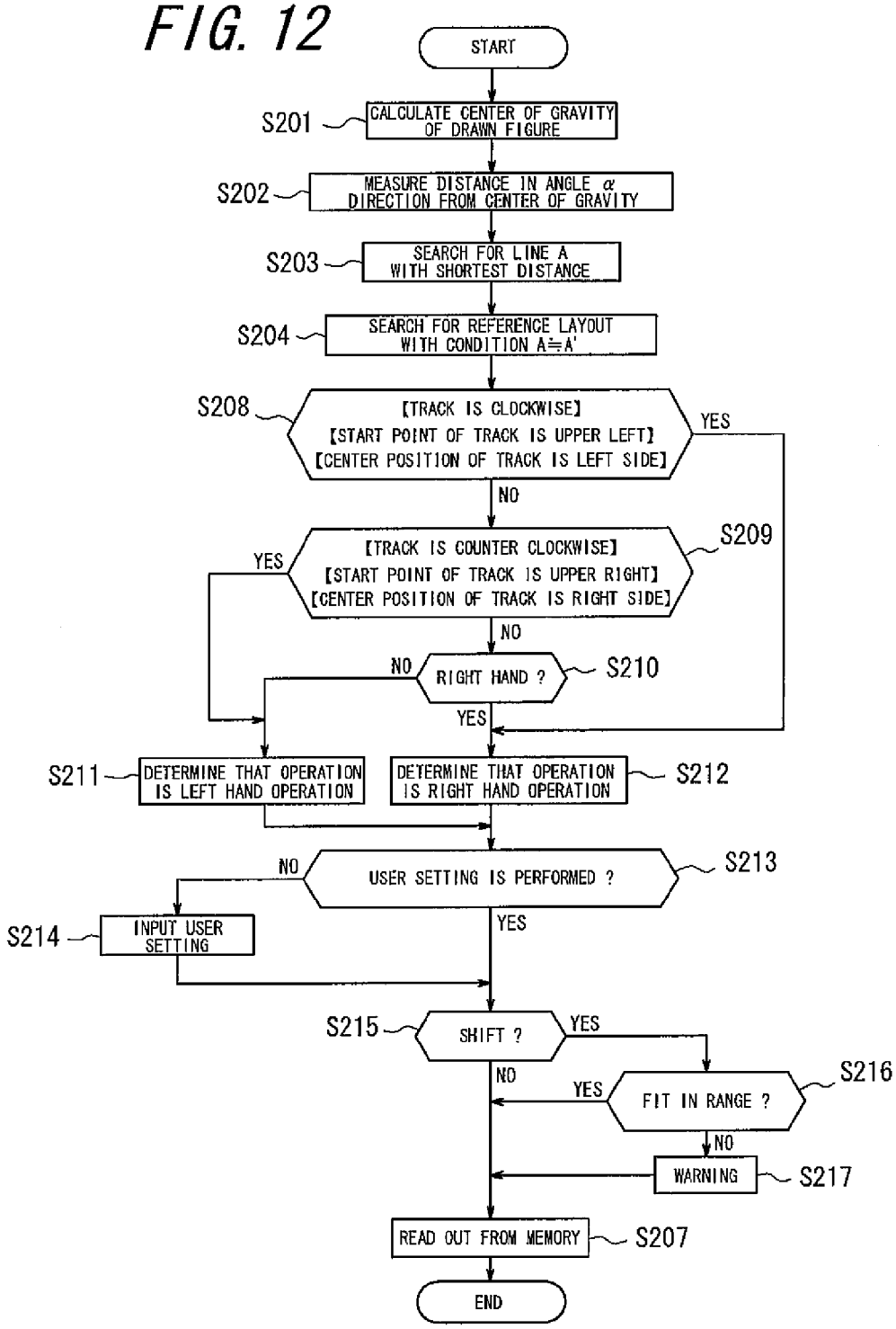
FIG. 12 is a flowchart for explaining layout processing according to the third embodiment.

When the user is using the portable terminal apparatus 1 holding the same with one hand, the user may feel it difficult to perform key operation in a layout of the operation key group displayed by initial setting or feel it difficult to perform key operation in layout display of the operation key group currently being used. Then, as shown in FIG. 4, the user draws in one stroke a simple line FIG. 12 of a substantially circular shape, polygonal shape, or the like (hereinafter referred to circular line figure) using a finger usually used for key operation. When the circular line FIG. 12 is drawn, the control unit 11 performs control such that a track is drawn as dots on a real time basis in a place of the display 4 corresponding to the line FIG. 12 drawn on the touch panel 5. This makes it easy for the user to check the input actual line FIG. 12.

In normal key operation, a finger touching the touch panel only touches one point for an instance. Therefore, the touch can be distinguished from a continuous input such as an action of intentionally drawing the circular line FIG. 12. The control unit 11 detects this continuous input and switches the portable terminal apparatus 1 to an operation key group layout setting mode.

It is also possible that switching unit (an operation key, etc.) for switching to the operation key group layout setting mode is separately provided and the control unit 11 performs control, on the basis of an input to this switching unit, to switch the portable terminal apparatus 1 to the operation key group layout setting mode and receive an input of a display position and a range of the operation key group.

The position determining unit 8 determines a display position of the operation key group on the basis of information of the circular line FIG. 12 drawn by the user. The range determining unit 7 determines a display range of the operation key group. In this case, the position determining unit 8 determines whether the input by the user is an input by right hand operation or left hand operation according to, for example, a position where the user starts to draw the circular line FIG. 12 and a direction from a start point to an end point of a track of the drawing. Further, the range determining unit 7 determines an inner side of the circular line FIG. 12 drawn by the user with the figure as a movable range 13 to which the finger naturally reaches. The range determining unit 7 determines a display range of the operation key group on the basis of the movable range 13.

When the user determines that a layout of the operation key group would be too small in the circular line FIG. 12 drawn earlier, the user can continuously draw the circular line FIG. 12 having a larger area. For this purpose, the control unit 11 desirably regards that a continuous action is started as the finger first touches the touch panel 5 and the continuous input operation is completed with the release of the finger drawing the circular line FIG. 12 from the touch panel as a trigger and transmits a signal corresponding to the continuous input operation to the determining unit 7 and 8. When the user performs an intentional operation of drawing the circular line FIG. 12, the control unit 11 switches the portable terminal apparatus 1 to the operation key group layout setting mode. Consequently, in the normal key operation, it is possible to prevent a malfunction in that the range determining unit 7 or the position determining unit 8 is activated when the finger slightly touches the operation key.

When the selecting unit 10 determines that the movable range 13 determined by the range determining unit 7 is too small and effective key operation cannot be performed even if a layout of the operation key group corresponding to the movable range 13 is displayed, the selecting unit 10 selects a standard key layout used until immediately before the portable terminal apparatus 1 is switched to the operation key group layout setting mode or a key layout during initial setting and displays the key layout on the display 4.

When the circular line FIG. 12 drawn by the user is too small as explained above, the control unit 11 can also emit alarm sound and call the user's attention to request the user to perform an input again or inform the user that the previous key layout (or the key layout during initial setting) is selected. When the user uses the portable terminal apparatus 1 holding a main body thereof with one hand, it is assumed that a finger that the user uses for key operation during normal operation is the thumb in most cases. Therefore, when a layout of the operation key group is set too small, the control unit 11 can prevent a key layout that tends to cause mis-input from being provided to the user by emitting the alarm or using the key layout set in advance.

Further, in a state in which key input is not performed for a long time, the control unit 11 can also set the display 4 in a sleep mode (an energy saving mode) for not driving the display 4 in order to prevent consumption of a battery. In this case, the sleep mode is canceled when the user draws a line figure on the touch panel 5 in one stroke with a finger or the like. The control unit 11 can also perform control to display a track of the line figure on the display 4. It goes without saying that, when the finger touches one point on the touch panel 5 for an instance, the control unit 11 can perform control such that the portable terminal apparatus 1 moves in a mode of the normal key operation.

Figure 5:
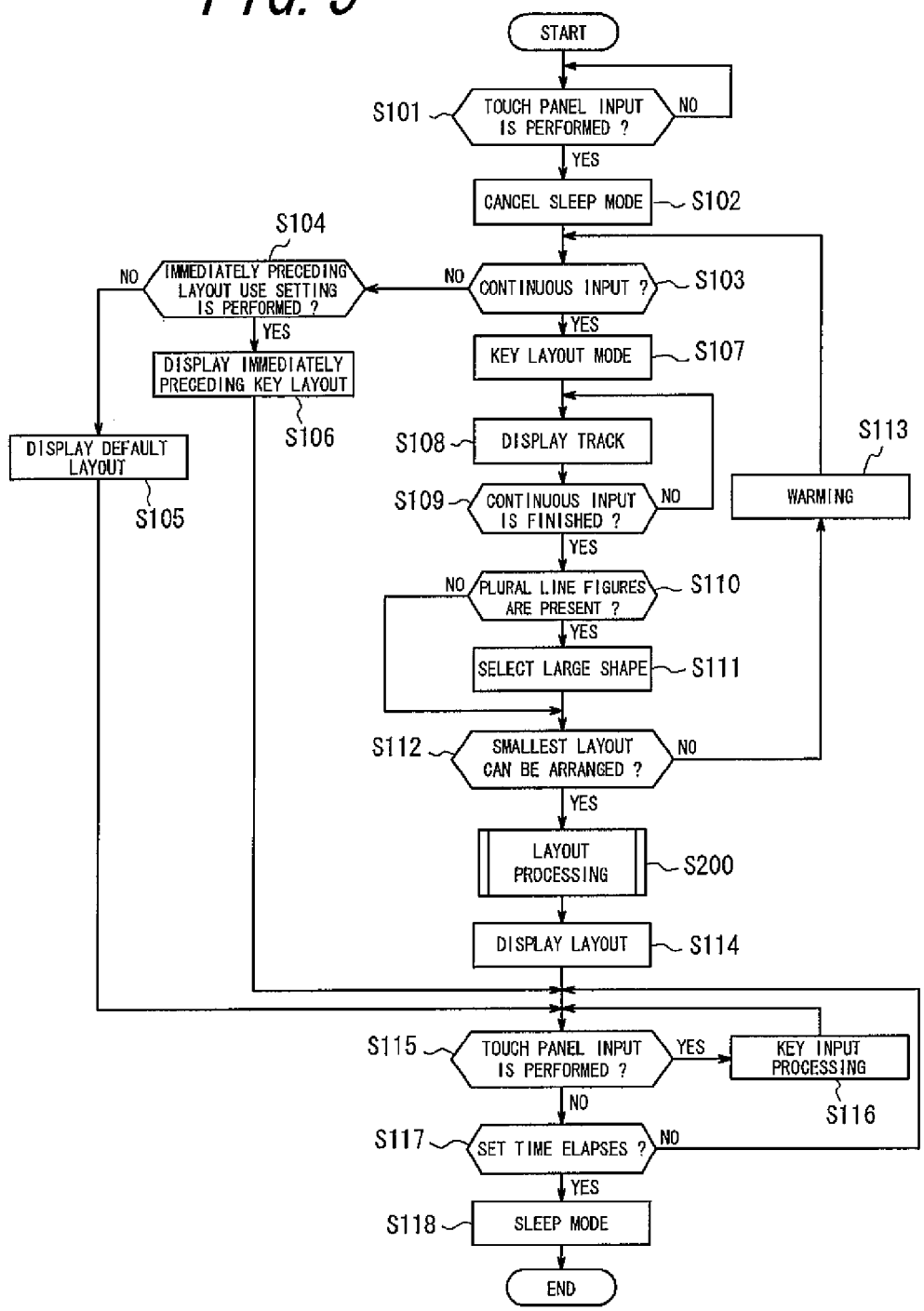
FIG. 5 is a flowchart for explaining operations in the first embodiment.

The operation key group layout method for the portable terminal apparatus 1 according to this embodiment is explained more in detail with reference to a flowchart shown in FIG. 5.

First, in step S101, the control unit 11 detects that the user touches the touch panel 5 with a finger or the like. When the display 4 is in the sleep mode, in step S102, the control unit 11 cancels the sleep mode (the energy saving ode).

Next, in step S103, the control unit 11 determines whether the user performs continuous input by drawing the circular line FIG. 12 in one stroke with the finger or the like on the surface of the touch panel 5. When the control unit 11 determines that input to the touch panel 5 is not the continuous input, i.e., the user desires normal operation, the control unit 11 proceeds to step S104. In step S104, the control unit 11 determines whether setting for displaying an immediately preceding key layout in use is made. When it is determined in step S104 that the setting for using the immediately preceding key layout is not made, in step S105, the layout display unit 6 displays a key layout of default setting stored in the memory 9 on the display 4. In step S105, the layout display unit 6 displays the default key layout selected from memory 9 by the selecting unit 10 on the display 4.

When the setting for using the immediately preceding key layout in use is made in step S104, in step S106, the layout display unit 6 displays the immediately preceding key layout in use on the display 4.

On the other hand, when it is determined in step S103 that the continuous input is performed on the surface of the touch panel 5, the control unit 11 determines that the user desires a change of the layout of the operation key group and, in step S107, switches the portable terminal apparatus 1 to the operation key group layout setting mode for performing setting of a layout of the operation key group.

Next, in step S108, in order to indicate that the finger of the user or the like touches the touch panel 5 and input is performed, the control unit 11 performs control to dot-display a track of positions touched by the finger on the display 4.

In step S109, the control unit 11 determines whether the continuous input is finished according to the release of the finger of the user or the like from the touch panel 5. When the continuous input is not finished, in step S108, the control unit 11 continuously dot-displays the track on the display 4. Consequently, the user can check the track drawn by the user, can see input positions on a real time basis, and, when the user feels that a drawn line figure is too small, can continuously draw a larger line figure.

When the control unit 11 determines in step S109 that the user has released the finger or the like from the touch panel 5, i.e., judges that the continuous input of the circular line FIG. 12 is finished, the control unit 11 proceeds to step S110.

In step S110, the control unit 11 determines whether the circular line FIG. 12 is drawn plural times. When the line figure is drawn plural times, in step S111, the control unit 11 selects a shape of a large track and shifts to step S112.

On the other hand, when the plural circular line FIG. 12 are not present in step S110, the control unit 11 selects a line figure presently being drawn and then shifts to step S112.

In step S112, the selecting unit 10 determines whether a smallest key layout set in advance can be arranged in a position and a range based on the selected line figure. When the smallest key layout cannot be arranged or when an appropriate key layout based on the selected line figure is not found, in step S113, the control unit 11 warns the user to that effect and performs control to return to the continuous input in step S103. Consequently, it is possible to prevent an excessively small and unpractical key layout from being selected.

When it is determined by the selecting unit 10 in step S112 that the key layout can be displayed in the position and the range based on the line figure, the control unit 11 proceeds to key layout processing in step S200. The key layout processing in step S200 is explained later.

In step S114, the control unit 11 reads a key layout based on information subjected to the key layout processing from the memory 9 using the selecting unit 10 and displays the key layout in the designated position and range on the display 4 using the layout display unit 6.

In step S115, the control unit 11 determines whether the finger of the user or the like touches the touch panel 5. When it is determined that the finger or the like touches the touch panel 5, in step S116, the control unit 11 performs processing for key input. In this processing, key operation not in the mode for performing the normal key operation, i.e., the operation key group layout setting mode is assumed.

When the user touches, with the finger or the like, a place on the touch panel 5 equivalent to the position of each of the keys displayed on the display 4, the control unit 11 recognizes that the key is pressed and emits confirmation sound and performs key input processing. After the control unit 11 performs key input processing in step S116, the control unit 11 returns to step S115 and waits for the next key input.

When the control unit 11 determines in step S115 that there is no key input from the touch panel 5, the control unit 11 proceeds to step S117 and measures time from the time when key input is performed last. When the measured time is within time set in advance, the control unit 11 returns to step S115 and waits for the next key input. On the other hand, when there is no key input after the time set in advance elapses, the control unit 11 proceeds to step S118 and switches the display 4 to the sleep mode.

FIGS. 6(A) and 6(B) are diagrams showing layout examples of keys by the operation key group layout method according to this embodiment.

When the user draws, for example, the circular line FIG. 12 on the touch panel 5, the range determining unit 7 reads a track of the circular line FIG. 12 and determines an inner side of the track as the movable range 13 in which the user can naturally move a finger. A key layout based on the range determined in this way is read out from the memory 9 by the selecting unit 10 and the read-out key layout is displayed on the display 4 by the layout display unit 6. These kinds of control are performed by the control unit 11. A large number of key layouts corresponding to various cases are stored in advance in the memory 9.

As patterns of the key layouts stored in the memory 9, for example, a pattern shown in FIG. 6(A) for fitting an entire key layout in an inner side of the circular line FIG. 12 drawn by the user is conceivable. A pattern shown in FIG. 6(B) or the like for, assuming that a range on a line of the circular line FIG. 12 drawn by the user is included in the movable range 13 of the finger, laying out all keys such that a track passes near the center of each of four keys arranged at four corners of the entire key layout is conceivable.

Figure 6:
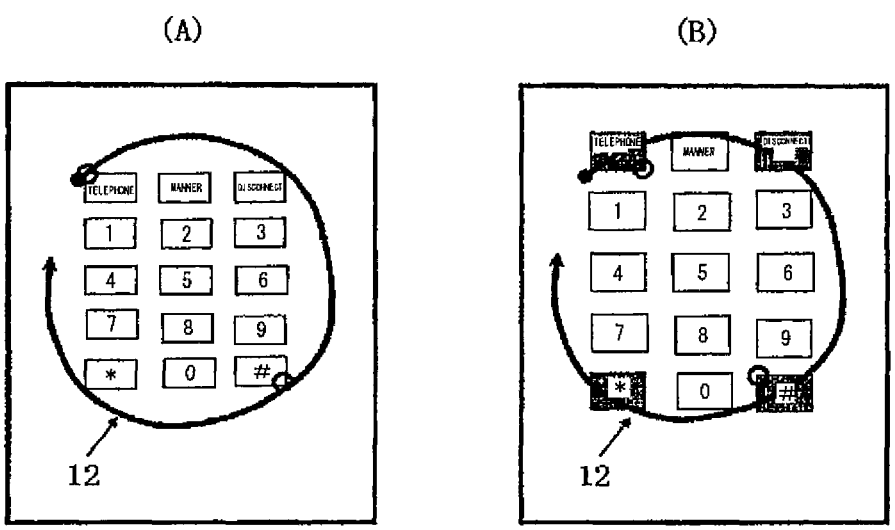
FIG. 6 is a diagram showing a key layout example according to the first embodiment.

By regarding that a part of the keys, for example, keys of "telephone", "manner", and "disconnect" as keys with low frequencies of use when an electronic mail is input in the portable terminal apparatus, it is possible to set a configuration of the pattern of the key layout shown in FIG. 6(A) or FIG. 6(B) with reference to, for example, four keys (e.g., in the case of FIG. 6, "1", "3", "#", and "*") arrayed at four corners of the entire key layout excluding these keys.

Figure 7:
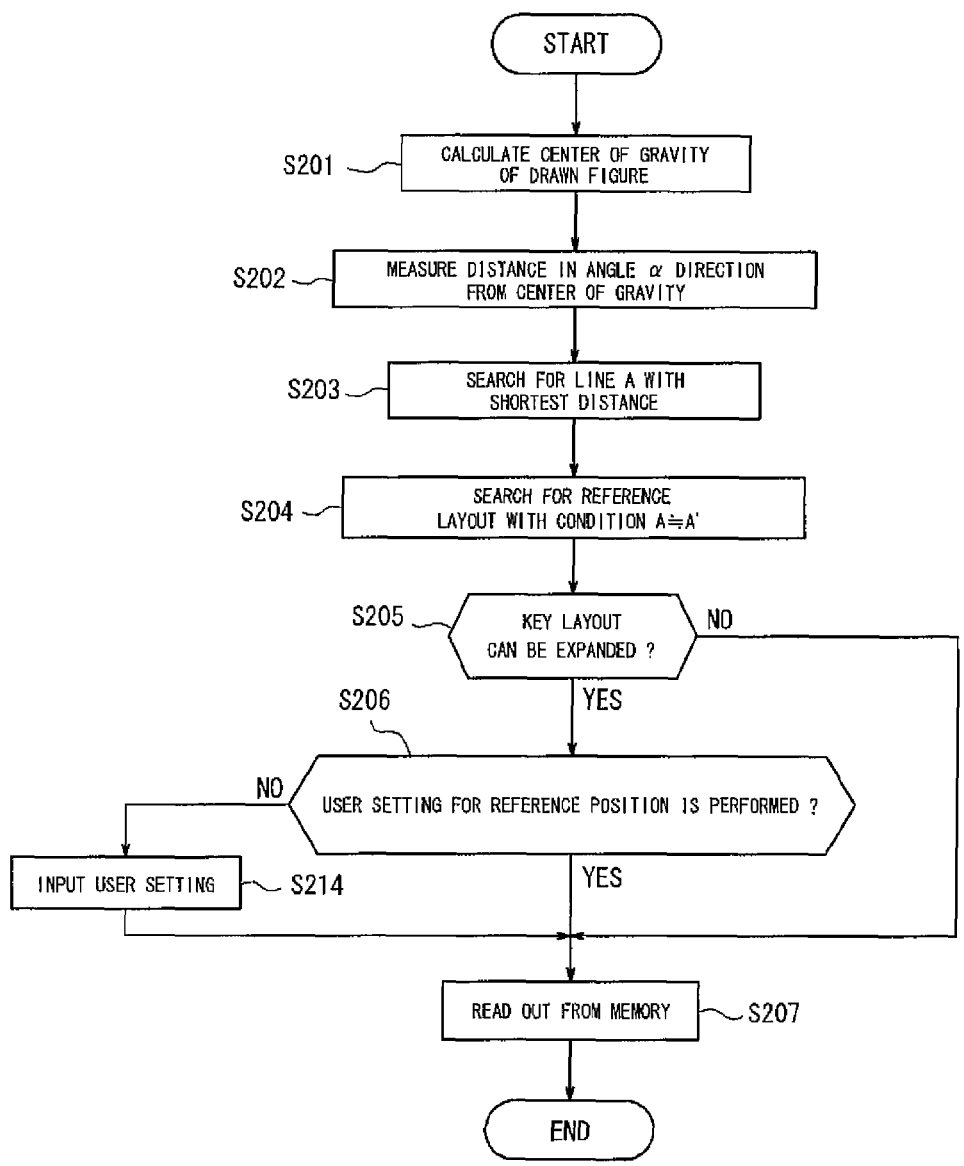
FIG. 7 is a flowchart for explaining details of layout processing shown in FIG. 5.

Next, the key layout processing in step S200 explained above is explained according to a flowchart shown in FIG. 7. In this example, it is assumed that a large number of patterns of a layout of keys with a fixed aspect ratio are stored in the memory 9.

First, in step S201, the control unit 11 calculates the center of gravity of a drawn figure from the circular line FIG. 12 drawn on the touch panel 5. At this point, when the drawn figure is not a closed figure, it is also possible to perform processing for connecting a start point and an end point to change the figure to an approximately circular figure.

Figure 8:
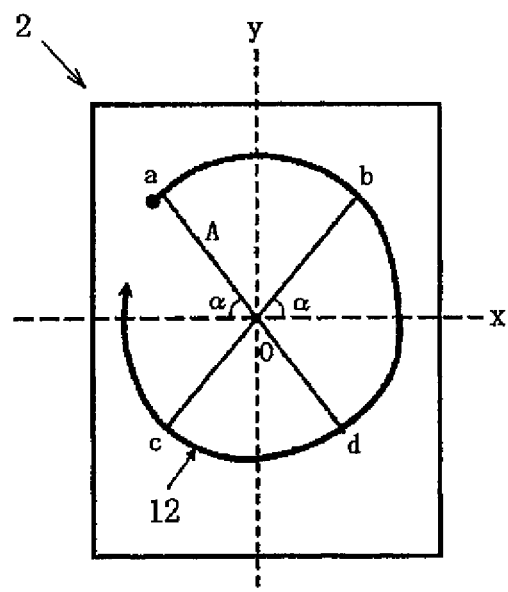
FIG. 8 is a diagram for explaining layout processing according to the first embodiment.

Next, in step S202, as shown in FIG. 8, the control unit 11 calculates a distance in the direction of an angle α from the center of gravity. The angle α is, when an x axis and a y axis orthogonal to sides of the rectangular input unit 2 are plotted with the center of gravity of the figure as the origin, a predetermined angle from the x axis. For example, α can be set to 45°. With the center of gravity calculated in step S201 represented as O and four intersections of two straight lines drawn in directions of angles ±α and the figure of the track represented as a, b, c, and d, the control unit 11 calculates lengths of segments Oa, Ob, Oc, and Od.

Next, in step S203, the control unit 11 selects a shortest one among the segments Oa, Ob, Oc, and Od, sets the shortest segment as a line A, and shifts to step S204. For example, it is assumed that the segment Oa is the shortest, i.e., Oa=A.

Figure 9:
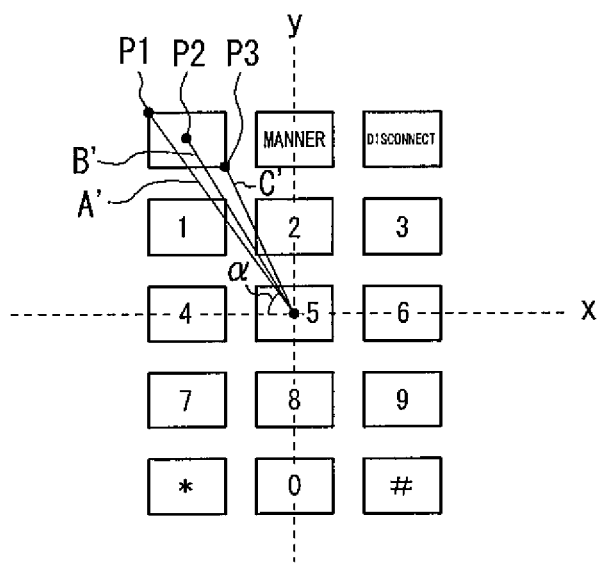
FIG. 9 is a diagram for explaining the layout processing according to the first embodiment.

In step S204, the selecting unit 10 selects a reference key layout fit in the track from the memory 9. As shown in FIG. 9, since the segment Oa is the shortest (Oa=A), the selecting unit 10 selects a key layout with A≥A' in which the circular line FIG. 12 drawn by the user passes a point P1. This key layout is included in the track of the circular line FIG. 12 drawn by the finger of the user.

Next, in step S205, when the user desires a larger key layout, i.e., a layout with a larger key interval, the selecting unit 10 determines whether a little more expanded key layout can be selected. For example, in a key layout in which A≈B', a line figure drawn by the user passes P2. The key layout is larger than the key layout in which A≥A' explained above. Similarly, in a key layout in which a line figure drawn by the user passes P3. The key layout is larger than the key layout in which A≈B' explained above.

When the circular line FIG. 12 is drawn in a largest size in a range of a key display area of the display 4 in step S205, the key layout (A≥A') included in the track of the line figure is a largest layout. Therefore, in step S207, the control unit 11 reads this key layout referring to the memory 9 and performs control to display the key layout on the display 4.

On the other hand, when it is determined by the selecting unit 10 in step S205 that it is possible to display a key layout larger than that in the case of A≈A', the control unit 11 proceeds to step S206.

In step S206, it is determined whether a size of a desired key layout is set in advance with respect to the line figure drawn by the user. In other words, it is determined whether the user sets in advance whether the user desires a key layout entirely included in the drawn line figure, a key layout in which the centers of keys at four corners (e.g., keys of "telephone", "disconnect", "#", and "*") are substantially on a line of the line figure, or a key layout in which the keys at the four corners circumscribe the line figure.

When the user setting is performed for the desired key layout in step S206, in step S207, the control unit 11 reads out a key layout corresponding to the user setting from the memory and performs control to display the key layout on the display 4. On the other hand, when the user setting is not performed, in step S214, the control unit 11 urges the user to input setting of a reference position. In step S207, the control unit 11 reads out a key layout corresponding to the setting from the memory 9 and displays the key layout on the display 4.

In this way, only by requesting the user to perform simple operation of the figure, it is possible to form a key layout with the movable range of the figure taken into account.

Second Embodiment

Next, a main part of an operation key group layout method for a portable terminal apparatus according to a second embodiment of the present invention is explained. This embodiment is different in the key layout processing in step S200 in the key layout method shown in FIG. 5 of the first embodiment.

As shown in FIG. 4, usually, when a user grips the portable terminal apparatus 1 with the right hand and draws the circular line FIG. 12 with the thumb on the touch panel 5, a start point of a track of the circular line FIG. 12 is located on the left side or the upper left. Further, the track is often drawn in the clockwise direction. A center position of the drawn track is located slightly further on the left or the upper left than a center position of the touch panel 5. It is possible to estimate, on the basis of these three kinds of information (the position of the start point of the track, the direction of the track, and the center position of the track), whether a finger with which the user performs operation in drawing the circular line FIG. 12 is a finger of the right hand or the left hand.

Assuming that the user operates the keys of the portable terminal apparatus 1 with the right hand, in a key layout of normal setting, the user has to operate keys located in a portion near the base of the thumb (i.e., in the case of right hand operation, keys of "#", "9", and "0", etc.) in a state in which the thumb is substantially bent. Therefore, it is extremely difficult to perform key operation. On the other hand, it is possible to operate, with natural movement of the finger, keys located apart from the base of the thumb even if the keys shift in a slightly more distant direction.

Figure 10:
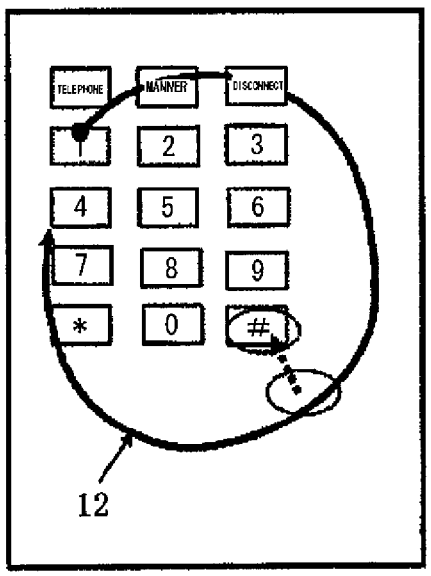
FIG. 10 is a diagram showing a layout example of an operation key group according to a second embodiment.
Figure 10:
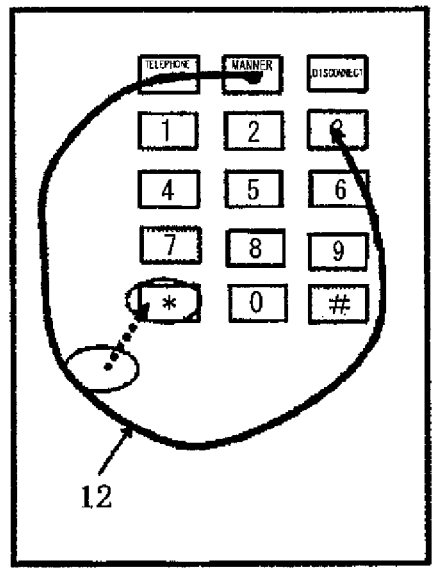

Therefore, when it is determined by the position determining unit 8 of the portable terminal apparatus 1 that the user operates the terminal with the right hand, as shown in FIG. 10(A), it is possible to remarkably improve operability of the keys by shifting the entire key layout slightly left upward. The user is allowed to adjust the distance of the shift. Further, it is also possible to reduce the entire key layout to the upper left without shifting positions of keys on the upper left at all.

Conversely, when the user grips the portable terminal apparatus 1 with the left hand and draws the circular line FIG. 12 on the touch panel 5 with the thumb, usually, a start point of a track of the circular line FIG. 12 is located on the right side or the upper right. Further, the track is often drawn in the counterclockwise direction. A center position of the drawn track is located slightly further on the right or the upper right than the center position of the touch panel 5. In this case, as shown in FIG. 10(B), the entire key layout is shifted to the upper right or reduced to the upper right, whereby effects same as those in the case of the right hand operation are obtained.

When the center position of the track of the drawn circular line FIG. 12 is not so different from the center position or a center line of the touch panel 5, the position determining unit 8 determines that the user grips the portable terminal main body 1 with the one hand and draws the circular line FIG. 12 with a finger of the other hand. In this case, it is also possible to display a key layout without any particular shift on the left and the right on the display 4 in a rather large size.

Further, it is also possible that a key layout set by the user in advance is stored in the memory 9 and, in a case other than the case in which the user draws the circular line FIG. 12, for example, when continuous input such as a vertical line or a horizontal line is performed on the touch panel 5, setting of a key layout corresponding to the user is performed by displaying a key layout corresponding to a range determined on the basis of the continuously-input line on the display 4.

Third Embodiment

Figure 11:
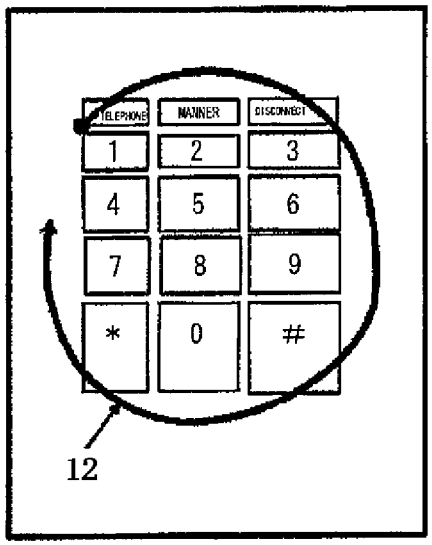
FIG. 11 is a diagram showing a layout example of an operation key group according to a third embodiment.
Figure 11:
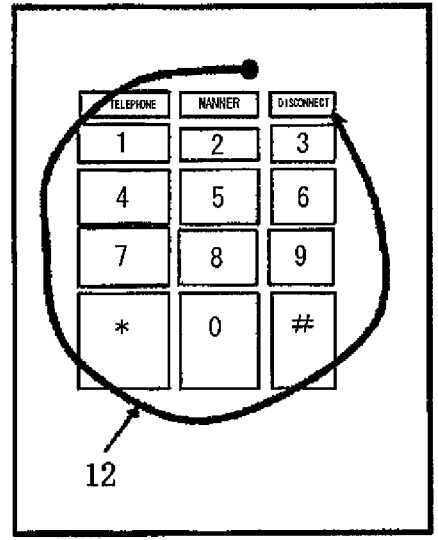

Next, a main part of an operation key group layout method for a portable terminal apparatus according to a third embodiment of the present invention is explained. In the second embodiment, in the key layout processing in step S200, as shown in FIGS. 10(A) and 10(B), sizes of the keys of the operation key group are the same. However, in this embodiment, further, it is possible to select a key layout in which sizes of keys of an operation key group are different as shown in FIGS. 11(A) and 11(B). It is possible to form a key layout in which, after it is determined by the position determining unit 8 that a hand for operating keys is the right hand or the left hand, areas of keys in a portion near the base of the thumb are increased and areas of keys are reduced as the keys are further away from the portion of the base of the thumb.

Further, it is also possible to select a configuration in which the keys in the portion near the base of the thumb are expanded and the keys are reset to the original sizes during key layout. The user may be allowed to freely set expansion and reduction ratios for the keys.

Key layout processing in step 200 according to this embodiment is explained below with reference to a flowchart of FIG. 12.

Since explanation of steps S201 to S204 is the same as that in FIG. 7, the explanation is omitted.

In step S208, the position determining unit 8 determines whether a hand with which the user operates the portable terminal apparatus 1 is the right hand. Concerning the circular line FIG. 12 drawn on the touch panel 5 by the finger of the user, when at least one of three items, (1) a track is drawn clockwise, (2) a start point position of the track is located on the left or the upper left, and (3) a center (or center of gravity) position of the track is located further on the left than the center in the horizontal direction of the touch panel 5 (a direction of keys "1" to "3") is satisfied, the position determining unit 8 proceeds to step S212 and determines that the operation is the right hand operation. In some case, it is also possible to determine that the operation is the right hand operation with an arbitrary combination of the three conditions set as a requirement.

When it is determined in step S208 that the operation is not the right hand operation, the position determining unit 8 proceeds to step S209 and determines whether the operation is left hand operation.

In step S209, concerning the circular line FIG. 12 drawn on the touch panel 5, when at least one of three items, (1) a track is drawn counterclockwise, (2) a start point position of the track is located on the right or the upper right, and (3) a center (or center of gravity) position of the track is located further on the right than the center in the horizontal direction of the touch panel 5 (a direction of keys "1" to "3") is satisfied, the position determining unit 8 proceeds to step S211 and determines that the operation is the left hand operation. In some case, it is also possible to determine that the operation is the left hand operation with an arbitrary combination of the three conditions set as a requirement.

When it cannot be determined in step S209 that the user performs the left hand operation, in step S210, the position determining unit 8 directly asks the user which hand is used for operation to thereby decide whether the operating hand is the right hand or the left hand.

When it is decided that the operating hand is the left hand or the right hand, in step S213, the control unit 11 determines whether user setting concerning a key layout is performed. In this user setting, for example, in the case of the right hand operation, items such as (1) whether an entire position of the key layout is shifted (FIG. 10(A)), (2) whether the position of the "telephone" key is fixed and the entire key layout is reduced to shift "#", and (3) whether a part of the keys is expanded and a part of the keys is reduced (FIG. 11(A)) are arbitrarily set by the user.

In step S207, the selecting unit 10 reads out a key layout corresponding to the user setting from the memory 9. When the user setting is not performed in step S213, in step S214, the control unit 11 requests the user to perform user setting.

If the user setting is setting concerning expansion of the keys, the selecting unit 10 reads out a key layout corresponding to the expansion from the memory 9. The layout display unit 6 displays the read-out key layout on the display 4. However, when it is set in the user setting to shift the entire key layout, in step S216, the range determining unit 7 determines whether an area to which the entire key layout can be moved (shifted) is present on the display 4.

When an area to which the entire key layout can be shifted is present, the control unit 11 reads out a key layout corresponding to the area from the memory 9 and displays the key layout on the display 4. When an area to which the entire key layout can be shifted is not present, in step S217, the control unit 11 emits a warning to the user, reads out a key layout that fits in the display range of the display 4 from the memory 9, and displays this key layout on the display 4. In displaying the key layout, for example, in the case of the right hand operation, when an area to which the entire key layout is shifted is not present in the upper right of the display area of the display 4, the control unit 11 fixes the position of the "telephone" key, reads out the key layout reduced as a whole to shift "#" from the memory 9, and displays the layout.

Fourth Embodiment

Next, a main part of an operation key group layout method for the portable terminal apparatus 1 according to a fourth embodiment of the present invention is explained.

In the first to third embodiments, when the user draws the circular line FIG. 12 on the touch panel 5, a layout of the operation key group corresponding to the movable range of the finger of the user is displayed on the display 4. However, thereafter, for example, depending on an application of a function to be used or a taste of the user or when the user shifts the portable terminal apparatus 1 from one hand to the other, it is anticipated that the user may desire to slightly adjust the position of the entire layout of the operation key group. In this case, if the user desires to change a configuration including the size of the entire layout of the operation key group, the user can reform a desired layout by repeating the operation key group layout method explained in the first to third embodiments from the beginning. However, when the user desires to change only the position of the layout without changing the size of the layout of the operation key group, with the method explained in the first to third embodiments, since the circular line FIG. 12 having the same size has to be drawn in different places, the operation is relatively difficult.

Figure 13:
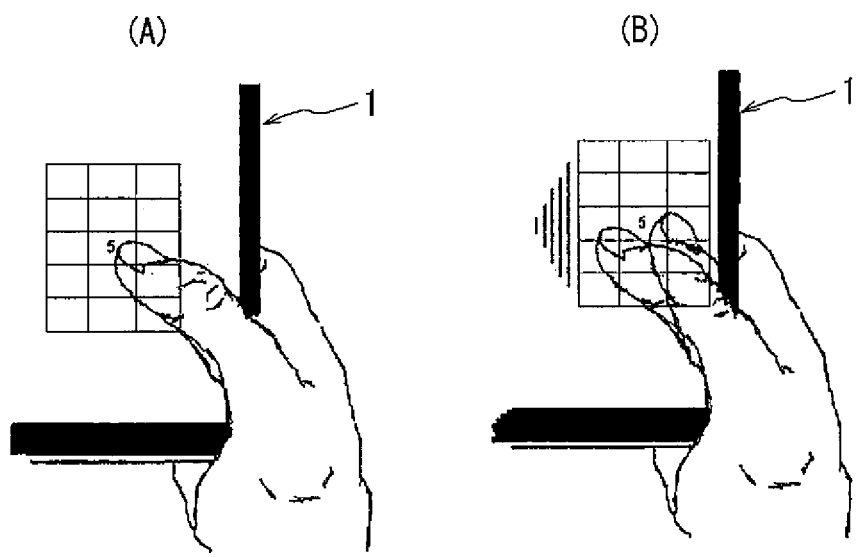
FIG. 13 is a diagram showing a layout example of an operation key group according to a fourth embodiment.
Figure 14:
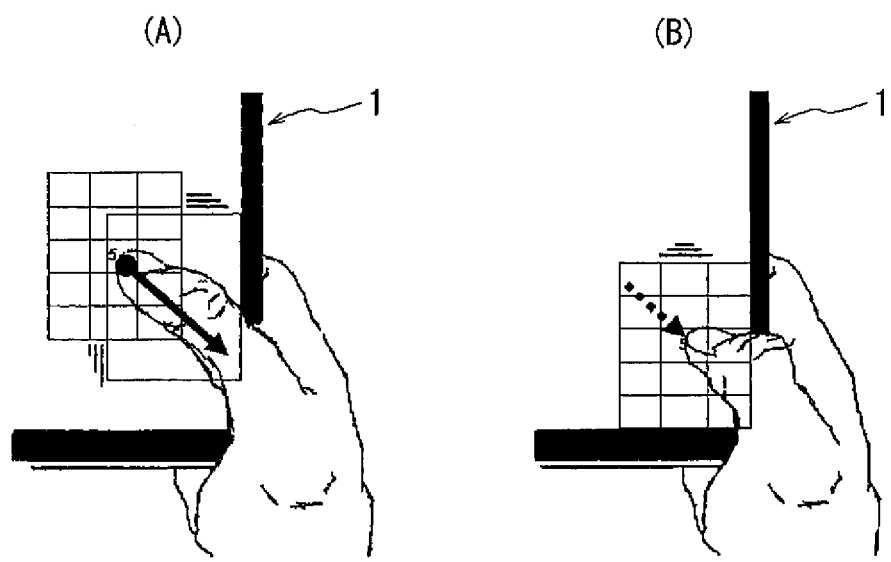
FIG. 14 is a diagram showing a layout example of the operation key group according to the fourth embodiment.

In the fourth embodiment of the present invention, it is possible to easily adjust only the position of a layout once formed without changing the size of the layout. The fourth embodiment is explained below with reference to FIGS. 13 to 15.

FIG. 13(A) shows a layout of the operation key group displayed on the display 4 according to the movable range of the finger of the user by the operation key group layout method explained in the first embodiment. For convenience of explanation, characters of a ten key and the like that should be displayed in the key layout shown in the figure are omitted except a part thereof. A case in which the user desires to move the entire layout display to the right is explained.

In this case, the user touches with the finger a portion of the touch panel 5 corresponding to an arbitrary point, e.g., a "5" key on the display 4 on which the key layout is displayed and strokes (drags) the portion to the right side with the finger continuously, i.e., while keeping on touching the touch panel 5. Continuous input for performing the stroking action on the touch panel 5 can be clearly distinguished from an action of touching an arbitrary point only for an instance like the normal button operation. When the user strokes the "5" key to the right side, a signal corresponding to the key is transferred from the touch panel 5 to the control unit 11. The control unit 11 controls the layout display unit 6 to move the entire key layout displayed on the display 4 to the right side according to an amount of movement of a stroked point without changing the size of the key layout as shown in FIG. 13(B).

When the user keeps the key layout to move to the right by stroking the key layout with the finger and the right end of the entire key layout moves to the right end of a displayable area of the display 4, if the user further moves the key layout display to the right side, the entire key layout cannot be completely displayed on the display 4. Therefore, in this case, the control unit 11 controls the layout display unit 6 not to further move the display of the key layout of the display 4 even if the user further strokes the key layout to the right.

The case in which the key layout is moved to the right side is explained above. However, it is also possible to move the entire key layout to the left by performing processing in the same manner by stroking the touch panel 5 to the left. It is also possible to move the entire key layout in the vertical direction by the same processing as the movement in the horizontal direction explained above.

FIGS. 14(A) and 14(B) show, as an example, operation in the case in which the entire key layout is moved in the lower right direction and a change in display on the display 4 due to the operation.

A case in which the entire key layout is moved to the lower right by stroking the touch panel 5 in a lower right direction while, for example, keeping the "5" key in the center of the key layout pressed as shown in FIG. 14(A) is explained. In FIG. 14(A), when a space between the right end of the entire layout before the movement and the right end of the displayable range of the display 4 and a space between the lower end of the entire key layout and the lower end of the displayable range of the display 4 are compared, the space on the lower side of the key layout is wider. Therefore, for example, when the user strokes the touch panel 5 with the finger in a lower right direction at an angle of 45° to move the key layout displayed on the display 4, the entire key layout reaches the right end before reaching the lower end of the display 4 (FIG. 14(A)). Up to this point, the display of the key layout moves on the display 4 in the same manner as the finger of the user moves. However, when the user still strokes the finger in the lower right direction at the angle of 45° even if the right end of the display of the key layout reaches the right end of the displayable range of the display 4, the control unit 11 controls the layout display unit 6 to prevent the display of the key layout from further moving in an X direction. Therefore, when the user further strokes the finger in the lower right direction at the angle of 45°, the display of the key layout moves only in a Y direction, i.e., the downward direction until the lower end of the display of the key layout reaches the lower end of the displayable range of the display 4 (FIG. 14(B)).

As shown in FIG. 14(B), when the lower end of the display of the key layout reaches the lower end of the displayable range of the display 4, even if the user further strokes the finger in the lower right direction at the angle of 45°, the control unit 11 controls the layout display unit 6 to prevent the display of the key layout from further moving in the right direction and the downward direction. Although not shown in the figure, when the user strokes the touch panel 5 in the upward direction, the left direction, or the upper left direction, it is also possible to move the entire key layout display in a direction corresponding to the direction from the state shown in FIG. 14(B).

Figure 15:
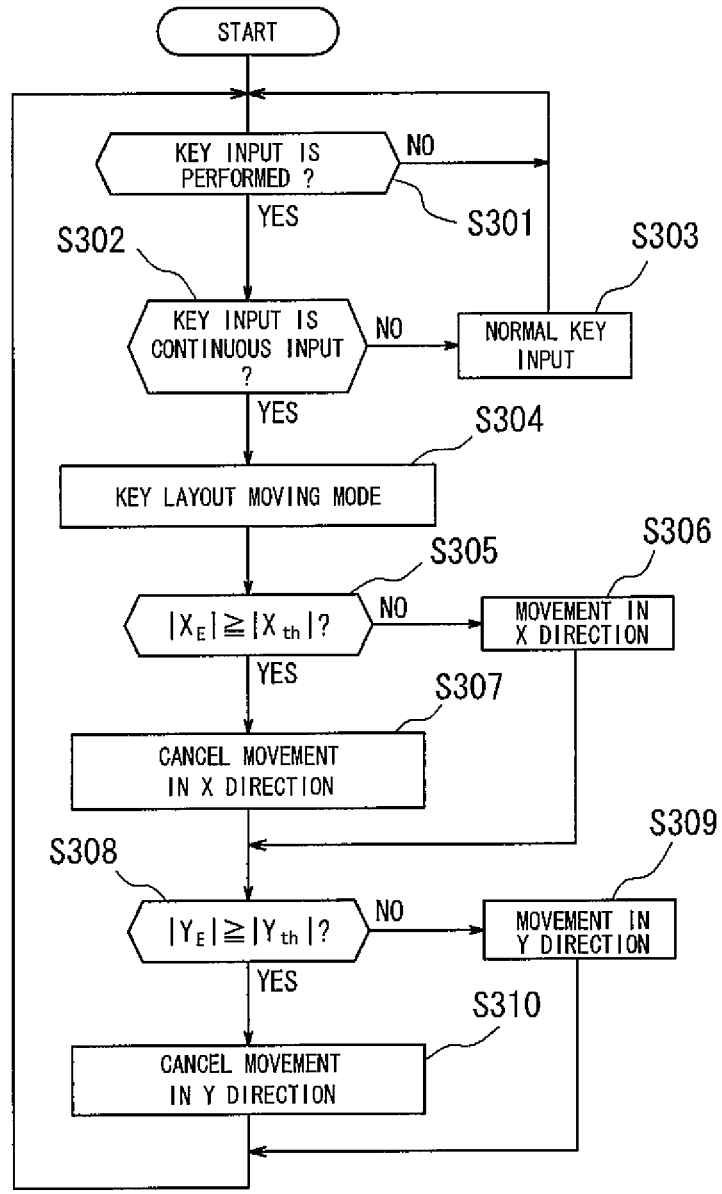
FIG. 15 is a flowchart for explaining movement of a layout according to the fourth embodiment.

FIG. 15 is a flowchart for explaining a movement processing operation for the layout of the operation key group explained above.

First, the control unit 11 determines whether there is input to the touch panel 5 (step S301). If there is input, the control unit 11 determines whether the input is input detected in one point for an instance or continuous input by the stroking action (step S302). When the input is the input detected at one point for an instance, the control unit 11 determines that the input is input by the normal key operation (step S303).

When the input operation is stroking operation, the control unit 11 does not determine that the operation is a key depressing operation and determines that the portable terminal apparatus 1 is in a key layout moving mode (step S304). In the flowchart of FIG. 15, processing performed in the key layout moving mode explained below is explained as being extremely finely sectioned (e.g., dot by dot in the display on the display 4) as a unit of an amount of movement (hereinafter referred to as movement unit).

In the key layout moving mode, first, the range determining unit 7 determines whether an absolute value of an X coordinate $X_E$ at the end in a moving direction in an entire operation key group layout displayed on the display 4 exceeds an absolute value of an X coordinate $X_{th}$ at the end in the displayable range of the display 4 (step S305). When the absolute value of the X coordinate $X_E$ does not exceed the absolute value of the X coordinate $X_{th}$, it is still possible to move the display of the key layout in a moving direction of the finger of the user. Therefore, the control unit 11 controls the layout display unit 6 such that the entire key layout moves on the display 4 by a distance equivalent to the movement unit (step S306). However, when the absolute value of the X coordinate $X_E$ at the end in the key layout is equal to or larger than the absolute value of the X coordinate $X_{th}$ at the end in the displayable range of the display 4, if the display of the key layout is further moved, at least a part of the key layout cannot be displayed. Therefore, the control unit 11 performs control to cancel the movement in the X direction (step S307).

Next, the determination same as that in the X direction is performed in the Y direction. The range determining unit 7 determines whether an absolute value of a Y coordinate $Y_E$ at the end in the moving direction in the displayed entire key layout exceeds an absolute value of a Y coordinate $Y_{th}$ at the end in the displayable range of the display 4 (step S308). When the absolute value of the Y coordinate $Y_E$ does not exceed the absolute value of the Y coordinate $Y_{th}$, the control unit 11 performs control such that the entire key layout moves on the display 4 by the distance equivalent to the movement unit (step S309). When the absolute value of the Y coordinate $Y_E$ is equal to or larger than the absolute value of the Y coordinate $Y_{th}$, the control unit 11 performs control to cancel the movement in the Y direction (step S310).

Consequently, concerning the X axis direction and the Y axis direction, actual input is reflected on the movement of the display or the actual input is canceled and is not reflected on the movement display. Thereafter, the control unit 11 returns to step S301 and determines presence or absence of further key input.

Fifth Embodiment

Next, a main part of a layout changing operation for an operation key group by the portable terminal apparatus 1 according to a fifth embodiment of the present invention is explained.

In this embodiment, when a user feels it difficult to operate the portable terminal apparatus 1 in the present key layout because of some reason, for example, when the user switches an application of the portable terminal apparatus 1 from a telephone function to a mail creation function, it is possible to easily change the key layout according to a form of use at that point.

Figure 16:
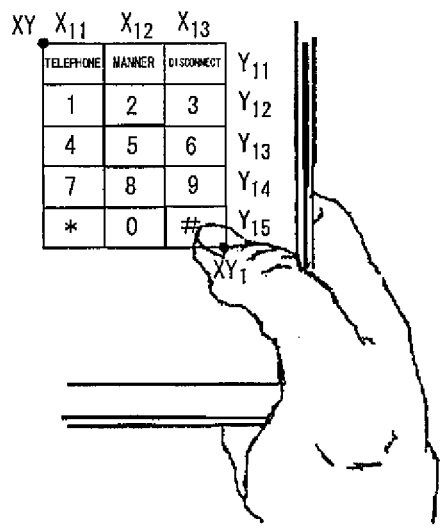
FIG. 16 is a diagram for explaining processing for changing a layout according to a fifth embodiment.
Figure 16:
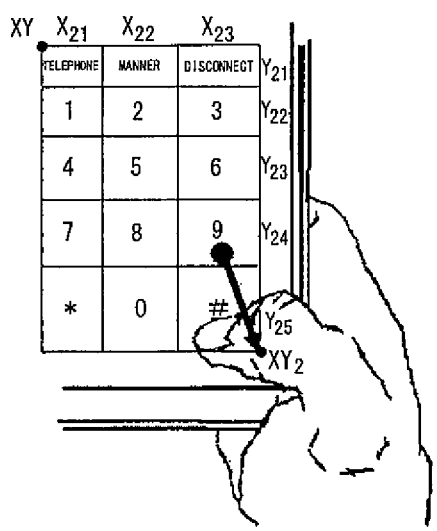

FIG. 16(a) is a layout of the operation key group displayed on the display 4 as explained above. Sizes of the keys are the same. As sizes in the horizontal direction of the keys, $X_{11}=X_{12}=X_{13}$. As sizes in the vertical direction of the keys, $Y_{11}=Y_{12}=Y_{13}=Y_{14}=Y_{15}$.

Next, when the user desires to change the key layout, the user presses, for example, a point on the lower right of a frame of the entire key layout, i.e., a position corresponding to the lower right (a point $XY_1$) of the "#" key on the touch panel 5 with a finger or the like and drags (strokes while keeping on touching) the position to a point (e.g., a point $XY_2$) on an outer side of the key layout frame indicated by an arrow in FIG. 16(b).

Then, information concerning the drag operation with this point $XY_1$ set as a pressing point (a starting point) is read by the control unit 11 from the touch panel 5. The control unit 11 sets, on the basis of this information, a point (e.g., a point XY) corresponding to the pressing point $XY_1$ (the starting point) as a fixed point, drags a display position of the pressing point $XY_1$ to the point $XY_2$ according to continuous moving input, and expands the operation key group to change the layout.

Figure 17:
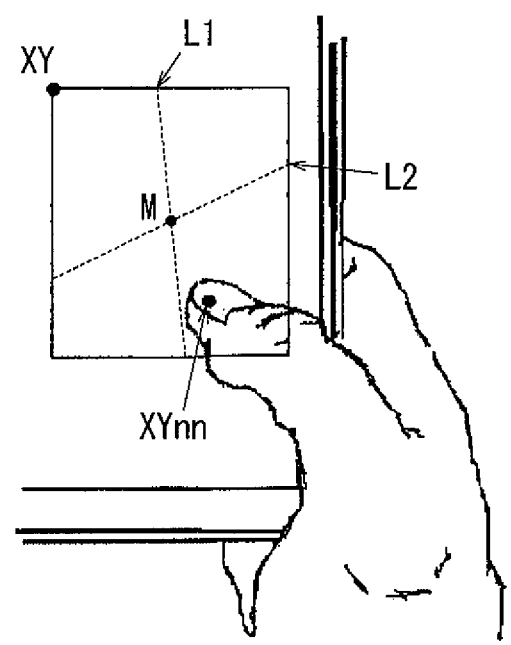
FIG. 17 is a diagram for explaining setting of a fixed point in changing the layout according to the fifth embodiment.

The fixed point is determined as explained below. As shown in FIG. 17, a center point M of the frame of the entire key layout is set and a display area of the key layout is divided into four by two arbitrary straight lines L1 and L2 passing through this center point M. For example, if the user starts drag operation starting from a point XYnn, in an area opposed to an area where the point XYnn is pressed among the four divided areas, a point most distant from the center point M (a vertex of a layout frame in the area opposed to the area where the point XYnn is pressed) is set as the fixed point XY.

Further, in this embodiment, when this layout is expanded, the periphery of the starting point ($XY_Z$) in the key layout before the expansion operation (drag) is expanded and displayed at a high expansion ratio and the periphery of the fixed point (XY) is expanded and displayed at a low expansion ratio such that expansion ratios of the keys are in a relation of $X_{21}<X_{22}<X_{23}$ in the horizontal direction and $Y_{21}<Y_{22}<Y_{23}<Y_{24}<Y_{25}$ in the vertical direction. The control unit 11 reads out such a layout from the memory 9 and displays the layout on the display 4 or calculates an expansion ratio every time and expands and displays the key layout before drag at the calculated expansion ratio. As the sizes of the keys are changed, it is also possible to change sizes of fonts of characters such as numbers on the keys according to the sizes of the keys and display the characters on the display 4.

After the user executes the movement of the key layout by the drag operation, when the user feels that the key layout is excessively moved, naturally, the user can reset the layout in the state shown in FIG. 16(b) to the state shown in FIG. 16(a) by performing drag operation in the opposite direction this time. It is possible to provide layouts matching users by performing such work to fine-tune the layouts.

Although not shown in the figure, for example, when one point on a bottom side of an outer frame of the entire layout (i.e., a line at the bottom of the "*", "0", and "#" keys) is pressed and dragged on the touch panel 5, the control unit 11 may perform control to expand and reduce the layout of the keys only in the vertical direction.

In this case, the sizes of the keys are changed only in magnifications in the vertical direction. In other words, a ratio of the sizes in the row direction of the keys is in a relation of $Y_{21}<Y_{22}<Y_{23}<Y_{24}<Y_{25}$ with an upper side of the outer frame of the entire layout as an opposed side (i.e., a line at the top of the keys "telephone", "manner", and "disconnect") set as a fixed axis.

Similarly, when one point on a side on the right side of the outer frame of the entire layout (i.e., a line on the right side of the keys "disconnect", "3", "6", "9", and "#") is pressed and dragged on the touch panel 5, it is possible to expand and reduce the layout of the keys only in the horizontal direction.

Further, if the point is further dragged from the pressing point ($XY_1$) on the X axis, it is possible to change the layout and the ratio of the sizes in the X axis direction of the keys, and if the point is dragged on the Y axis, it is possible to change the layout and the ratio of the sizes in the Y axis direction of the keys.

The example in the case in which the entire layout of the keys is expanded and reduced is explained above. Next, a case in which a layout is expanded with a specific key set as the center is explained. Such a layout can be used, for example, when it is desired to enlarge and use keys with high frequencies of use.

FIG. 18(a) is a key group displayed first on the display 4 according to the layout of the operation key group. Sizes of the keys are the same. As sizes in the horizontal direction of the keys, $X_{41}=X_{42}=X_{43}$. As sizes in the vertical direction, $Y_{41}=Y_{42}=Y_{43}=Y_{44}=Y_{45}$.

It is assumed that, from this state, the user presses, with a finger or the like, for example, one point on the lower right of the key layout, i.e., a position (a starting point) equivalent to the lower right (a point $XY_{41}$) of the "8" key on the touch panel 5 and directly drags the position to an outer side of the key layout frame up to a point $XY_{51}$ indicated by an arrow in FIG. 18(b).

Then, information concerning the drag operation with this $XY_{41}$ set as a pressing point (a starting point) is scanned from the touch panel 5 by the control unit 11. The control unit 11 performs control to change the layout of the operation key group on the basis of this information. In this case, after the drag operation, a key layout of a rectangular area having, as a diagonal line, a segment connecting two points, i.e., the pressing point ($XY_{41}$) before the drag and the point XY as the fixed point corresponding to this pressing point, is expanded to a key layout having, as a diagonal line, a segment connecting the pressing point ($XY_{51}$) after the drag and the point XY as the fixed point. The other keys are arranged in a layout in which the keys arrayed in the vertical direction are enlarged without the sizes in the horizontal direction being changed and the key arrayed in the horizontal direction are expanded without the sizes in the vertical direction being changed. The layout is a key layout in which expansion ratios in the horizontal direction of the key sizes are in a relation of $X_{51} < _{52}$, $X_{53} = X_{43}$ and expansion ratios in the vertical direction are in a relation of $Y_{51} < Y_{52} < Y_{53} < Y_{54}$, $Y_{55} = Y_{45}$. The control unit 11 reads out such a layout from the memory 9 and displays the layout on the display 4 or calculates an expansion ratio every time and expands and displays the key layout before the drag at the calculated expansion ratio.

In FIG. 18(b), the key group is expanded with a specific key in the frame of the entire layout of the keys set as the center. However, as shown in FIG. 18(c), it is also possible to expand and reduce and display the keys in the frame of the entire layout with a specific key in the frame set as the center without changing the size of the frame of the entire layout of the keys.

It is assumed that, with the same drag operation as above, the user presses one point (the point $XY_{41}$ as the starting point in FIG. 18(a)) equivalent to the position on the lower right of a key with a high frequency of use, for example, the "8" key on the touch panel 5, drags the point to the outer side of the key layout up to a point (a point $XY_{61}$) indicated by an arrow in FIG. 18(c), and releases the finger. In this case, the size of the frame of the entire key layout is not changed and the keys in the frame of the entire layout are expanded and reduced. In this example, keys are reduced and displayed on a column of $X_{63}$ and a row of $Y_{65}$. The other keys are expanded and displayed in a relation of $X_{61} < X_{62}$ in the horizontal direction and a relation of $Y_{61} < Y_{62} < Y_{63} < Y_{64}$ in the vertical direction. The control unit 11 reads out such a layout from the memory 9 and displays the layout on the display 4 or calculates an expansion ratio and a reduction ratio every time and expands and displays the key layout before the drag at the calculated expansion ratio.

Consequently, it is possible to change sizes of only arbitrary keys in the original key layout without changing the size of the entire key layout.

As explained above, according to this embodiment, the user can easily change the key layout to a desired layout by starting drag from an arbitrary point of the key layout, and thus operability is improved.

The present invention is not limited to the embodiments explained above and various modifications and alterations are possible. For example, in the embodiments, first, the user draws the circular line FIG. 12 and, after a layout of keys is set on the basis of the circular line FIG. 12, changes the layout to a desired layout. However, naturally, it is also possible to perform the layout change on the basis of the key layout set as the default in the state of the initial setting.

Although not shown in the figure, when the movable range 13 of the finger is determined, rather than requesting the user to draw the circular line FIG. 12 on the touch panel 5, it is also possible to request the user to draw a linear line figure oblique to the rectangular input unit 2 and read out a key layout based on a rectangle having this line figure as a diagonal line from the memory 9 or calculate an expansion ratio, expand the key layout before drag, and displays the key layout on the display 4.

Further, in the first to third embodiments, the control unit 11 may perform processing to calculate the size and the like of the key layout on the basis of the determined movable range 13 and expand or reduce the predetermined key layout stored in the memory 9 according to a calculation result.

In the fourth embodiment, when the user strokes the touch panel 5 with the finger, the "5" key among the operation key group is used. However, naturally, it is also possible to perform the input operation using the keys other than the "5" key. What is used in the input operation is not limited to an arbitrary key. It is also possible to perform setting to move the display of the entire key layout using an arbitrary point such as an end of a key, an edge of a key, a boundary line displayed between keys, or an end of the entire key layout. Further, as this arbitrary point used in the input operation, it is also possible to perform setting to use a predetermined point decided in advance in performing input operation on the touch panel 5 corresponding to the key layout displayed on the display 4.

In the fourth embodiment, a distance in which the layout of the operation key group moves on the display 4 is determined according to a distance in which the user strokes the touch panel 5 with the finger. However, when the moving distance and the stroking distance are set in one to one correspondence, since the stroking distance and the moving distance are the same, it is easy to perform visual operation. However, the correspondence between the moving distance and the stroking distance does not always have to be the one to one correspondence. For example, as in the case of a fine-tuning purpose, even if the distance in which the touch panel 5 is stroked is set larger, it is also possible to set a distance in which the layout actually moves on the display 4 to be smaller.

Further, in the fifth embodiment, when the operation for changing the key layout is performed, the key group is expanded by dragging the finger from the layout before change to the outer side of the layout. However, it is also possible to reduce the key group by dragging the finger from the layout before change to the inner side of the layout. In this case, when one point of the outer frame of the entire key layout is reduced by dragging the point, the entire layout is reduced and the key group is reduced at a stepwise reduction ratio. When one point in the inside of the key layout is further dragged to the inner side, it is possible to perform processing in reducing the key group with, in particular, a dragged key as the center and reducing the entire layout or processing in reducing, in particular, the dragged key and mixing keys to be expanded and keys to be reduced around the key without changing the size of the entire layout.

The portable terminal apparatus 1 according to the embodiments of the present invention can be typically a terminal apparatus such as a cellular phone. However, the present invention is not limited to this. The present invention can be applied to various portable terminal apparatuses including portable terminal apparatus such as a PDA.

INDUSTRIAL APPLICABILITY

According to the present invention, in a portable terminal apparatus that displays an operation key group on a display unit to perform input operation via a touch panel, in setting a layout of the operation key group, a user of the terminal draws a simple line figure on the touch panel with a finger of a hand or the like, whereby a movable range of the finger is determined. On the basis of the movable range, a layout of the operation key group with the movable range of the finger of the user taken into account is selected and displayed on the touch panel. Therefore, even if users having hands of various sizes use this portable terminal, a layout of the operation key group optimized according to a user is set. It is possible to remarkably improve operability when the user operates the operation key group during normal use of the portable terminal.

According to the present invention, continuous moving input by the touch panel starting from one point in a display range of the operation key group is detected, the starting point is moved according to the continuous moving input with one point corresponding to the starting point set as a fixed point, the display range of the operation key group is expanded or reduced according to the movement of this starting point, and at least a part of the operation key group is expanded or reduced. Therefore, the user can easily change the operation key group displayed on the touch panel to a desired layout by, performing an operation for dragging (stroking) on the touch panel. It is possible to improve operability.

The invention claimed is:

1. A portable terminal apparatus, comprising:
a display unit that displays an operation key group, and
a touch panel, wherein
the portable terminal apparatus can determine whether an operation of drawing a line figure on the touch panel is input by right hand or left hand operation, and
the portable terminal apparatus can change the operation key group displayed on the display unit into an operation key group for left hand operation and into an operation key group for right hand operation.

2. The portable terminal apparatus according to claim 1, characterized by, after displaying the operation key group on the display unit, moving a display position of the operation key group according to continuous input starting from one point of the operation key group to adjust the display position of the operation key group.

3. The portable terminal apparatus according to claim 2, characterized by prohibiting, in moving the display position of the operation key group according to the continuous input starting from the one point of the operation key group, at least a part of the operation key group from not being displayed on the display unit.

4. A portable terminal apparatus, comprising:
a display unit that displays an operation key group, and
a touch panel,
wherein, when the operation key group displayed on the display unit is changed on the basis of a drag operation on the touch panel, the portable terminal apparatus changes at least two keys of the operation key group at at least two different expansion or reduction ratios.

5. The portable terminal apparatus according to claim 4, characterized by changing the at least two keys of the operation key group to expand an area including a starting point of the drag operation more than an area including another key of the operation key group.

6. The portable terminal apparatus according to claim 4, characterized by, after displaying the operation key group on the display unit, moving a display position of the operation key group according to continuous input starting from one point of the operation key group to adjust the display position of the operation key group.

7. The portable terminal apparatus according to claim 6, characterized by prohibiting, in moving the display position of the operation key group according to the continuous input starting from the one point of the operation key group, at least a part of the operation key group from not being displayed on the display unit.

8. A portable terminal apparatus, comprising:
a display unit that displays an operation key group, and
a touch panel, wherein
the portable terminal apparatus can determine whether an operation of drawing a line figure on the touch panel is input by right hand or left hand operation, and
the portable terminal apparatus can switch to a mode for setting a layout of the operation key group by operation input on the touch panel, and wherein the portable terminal apparatus can expand or reduce a display of an operation key group for left hand operation and can expand or reduce a display of an operation key group for right hand operation, in the mode for setting a layout of the operation key group.

9. The portable terminal apparatus according to claim 8, characterized by, after displaying the operation key group on the display unit, moving a display position of the operation key group according to continuous input starting from one point of the operation key group to adjust the display position of the operation key group.

10. The portable terminal apparatus according to claim 9, characterized by prohibiting, in moving the display position of the operation key group according to the continuous input starting from the one point of the operation key group, at least a part of the operation key group from not being displayed on the display unit.

11. A method for controlling a portable terminal apparatus, comprising:
a display unit that displays an operation key group, and
a touch panel, wherein
the portable terminal apparatus can determine whether an operation of drawing a line figure on the touch panel is input by right hand or left hand operation, and
the portable terminal apparatus can change the operation key group displayed on the display unit into an operation key group for left hand operation and into an operation key group for right hand operation.

12. A method for controlling a portable terminal apparatus, comprising:
a display unit that displays an operation key group, and
a touch panel,
wherein, when the operation key group displayed on the display unit is changed on the basis of a drag operation on the touch panel, the portable terminal apparatus changes at least two keys of the operation key group at at least two expansion or reduction ratios.

13. A method for controlling a portable terminal apparatus, comprising:
a display unit that displays an operation key group, and
a touch panel, wherein
the portable terminal apparatus can determine whether an operation of drawing a line figure on the touch panel is input by right hand or left hand operation, and
the portable terminal apparatus can switch to a mode for setting a layout of the operation key group by operation input on the touch panel, and wherein the portable terminal apparatus can expand or reduce a display of an operation key group for left hand operation and can expand or reduce a display of an operation key group for right hand operation, in the mode for setting a layout of the operation key group.

* * * * *